United States Patent
Tsuji et al.

(10) Patent No.: US 7,801,737 B1
(45) Date of Patent: Sep. 21, 2010

(54) DATA DISTRIBUTING SYSTEM AND DATA RECORDING METHOD

(75) Inventors: Sadafusa Tsuji, Tondabayashi (JP); Takashi Kondo, Sakai (JP); Hideo Hotomi, Nishinomiya (JP); Isao Hayami, Ashiya (JP); Katsuyuki Nanba, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/534,255

(22) Filed: Mar. 23, 2000

(30) Foreign Application Priority Data

Mar. 30, 1999 (JP) ............................. 11-089721
Mar. 30, 1999 (JP) ............................. 11-089722

(51) Int. Cl.
*G06Q 10/00* (2006.01)
(52) U.S. Cl. .......................... 705/1.1; 705/26
(58) Field of Classification Search .................. 705/26, 705/27, 1, 33.34; 707/1, 10, 104.1
See application file for complete search history.

(56) References Cited

U.S. PATENT DOCUMENTS

| | | | | | |
|---|---|---|---|---|---|
| 5,769,269 | A | * | 6/1998 | Peters | 221/7 |
| 5,845,074 | A | * | 12/1998 | Kobata | 709/219 |
| 5,918,213 | A | * | 6/1999 | Bernard et al. | 705/26 |
| 6,009,401 | A | * | 12/1999 | Horstmann | 705/1 |
| 6,201,771 | B1 | * | 3/2001 | Otsuka et al. | 369/30.32 |
| 6,226,618 | B1 | * | 5/2001 | Downs et al. | 705/1 |
| 6,263,313 | B1 | * | 7/2001 | Milsted et al. | 705/1 |
| 6,298,332 | B1 | * | 10/2001 | Montague | 705/27 |
| 6,330,490 | B1 | * | 12/2001 | Kim et al. | 700/234 |
| 6,330,670 | B1 | * | 12/2001 | England et al. | 713/2 |

FOREIGN PATENT DOCUMENTS

JP  4-273598 A  9/1992

(Continued)

OTHER PUBLICATIONS

Business Wire: "SourceAlliance Selects BroadVision to Build Marketplace for the Electrical Products Industry"; Sep. 20, 2000, p. 0385.*

(Continued)

*Primary Examiner*—Naresh Vig
(74) *Attorney, Agent, or Firm*—Sidley Austin LLP

(57) ABSTRACT

A data distributing system wherein an electronic book data storage center which is stored with a plurality of pieces of book data is capable of communicating with electronic book vending machines 2 via a communication line and/or a communication satellite. In each of the vending machines, a storage medium can be inserted. The vending machine selects a piece of book data, which may be desired by the user, based on data stored in the storage medium as data to be to recorded into the storage medium. The user himself or herself can select a piece of book data. Also, the recorded data can be deleted from the storage medium in compliance with the user's request. These vending machines may have a function of casting accounts.

7 Claims, 15 Drawing Sheets

FOREIGN PATENT DOCUMENTS

| JP | 5-89363 A |  | 4/1993 |
|----|-----------|---|--------|
| JP | 5-48087 U |  | 6/1993 |
| JP | 08-077455 A |  | 3/1996 |
| JP | 08077455 A | * | 3/1996 |
| JP | 10-091640 A |  | 4/1998 |
| JP | 2000011251 A | * | 1/2000 |
| JP | 2001-229285 | * | 8/2001 |

OTHER PUBLICATIONS

Foundatoin Report 92, Blockbuster Entertainment and IBM Are Developing a System to Let Consumers Create Their Own CDs and Videos, © 1997, CSC Index Research and Advisory Services.*

Remedia Customer Service, 1997, Remedia Publications.*

Information on Windows NT 4.x, Images created on Apr. 7, 2005.*

Japanese "Notification of Reasons for Refusal", dated May 27, 2008, for counterpart Japanese Patent Application No. 11-089721, Together with an English-translation thereof.

* cited by examiner

FIG. 13a

MONTHLY MAGAZINES INTO SALE TODAY

MONTHLY SCIENCE
MONTHLY xx
SPORT xx
NO

FIG. 13b

PRIMARY CAT.          SELECT
  STORIES
  TECHNICAL BOOKS
  PRACTICAL BOOKS
  PICTORIAL BOOKS     NEXT

FIG. 13c

SECONDARY CAT.        SELECT
(PRACTICAL BOOKS)
  PLEASURE
  BUSINESS
  COMPUTER
    LANGUAGES         NEXT

FIG. 13d

THIRD CAT. (MAGAZINES-SPORTS)
SELECT
BASEBALL
SOCCER                NO
SKI                   NEXT

FIG. 13e

SELECT
MONTHLY BASEBALL xx
HOMERUN xx
INFORMATION BASEBALL    NO
HIGH-SCHOOL BASEBALL xx NEXT

FIG. 13f

INSERT STORAGE MEDIUM

FIG. 13g

SUBSEQUENT NOS/VOLS
SELECT                    NO

WEEKLY xx
MONTHLY xx
STORIES xx VOL. 13

FIG. 13h

REVISIONS
REVISIONS IN SALE
xx JAPANESE DICTIONARY
xx ENGLISH-JAPANESE DICTIONARY
xx ROAD MAP

FIG. 13i

PRIORITY IN BOOK SEARCH·
SUBSEQUENT NOS/VOLS
REVISIONS
WRITERS
CATEGORY

FIG. 13j

SEARCH

TITLE
WRITER
PUBLISHER

FIG. 13k xxx OF JAPAN

FINE WORK OF MR. xx
THE FUTURE OF JAPAN...

FIG. 13l xxx OF JAPAN

COME INTO SALE
ON AUG. 28

FIG. 13m

```
REVISIONS
RESTAURANTS              $xx   CONTENTS  BUY

SUBSEQUENT NOS/VOLS
MONTHLY xx               $xx   CONTENTS  BUY
xx TIME VOL. 15          $xx   CONTENTS  BUY

BOOKS BY SAME WRITERS (MR. xx)
CASE OF xx               $xx   CONTENTS  BUY
DETECTIVE xx             $xx   CONTENTS  BUY

NEXT  ENTER  CANCEL
```

DATA DISTRIBUTING SYSTEM AND DATA RECORDING METHOD

This application is based on application Nos. 11-89721 and 11-89722 filed in Japan, the content of which is hereby incorporated by reference.

BACKGROUND OF THE INVENTION

1. Field of the Invention

The present invention relates to a data distributing system and a data recording method, and more specifically to a data distributing system to distribute desired book data to users by recording the book data into users' data storage media such as optical disks and a data recording method adopted in the data distributing system.

2. Description of Related Art

In recent years, a system to distribute book data widely by recording the book data in rewritable storage media such as optical disks and to reproduce the data by use of portable electronic book players or personal computers is suggested. In this specification, the book data mean information which is conventionally distributed as printed matter such as books, weekly and monthly magazines, technical books, newspapers, advertisements, etc.

In order to realize the data distributing system, it is necessary that users can store desirable book data in their storage media at places where they can stop by easily, such as convenience stores and stands at stations, etc.

In another aspect of this system, when users buy book data, they cannot see the content directly as they can in buying paper books, and there is fear that users may buy different book data from what they have wanted. Accordingly, when a user wants to return book data for this reason or to delete book data from a storage medium because of lack of storage capacity of the storage medium, it is necessary to comply with such a demand.

SUMMARY OF THE INVENTION

An object of the present invention is to provide a data distributing system wherein users can store desired data in storage media easily and a data recording method adopted in the system.

Another object of the present invention is to provide a data distributing system wherein users can store desired data in storage media easily and also can delete the recorded data from the storage media and a data recording method adopted in the system.

In order to attain the objects, a data distributing system according to the present invention comprises: a storage section which stores a plurality of pieces of data; a receiving section which receives a storage medium; a reading section which reads at least part of data stored in the storage medium which is set in the receiving section; a selecting section which selects a specified piece of data from the data stored in the storage section in accordance with the data read out by the reading section; and a recording section which records the selected data into the storage medium.

The receiving section, the reading section, the selecting section and the recording section are integrated into one unit, and such units are installed in a plurality of places. These units are connected to the storage section by communication means including a telephone line and a communication satellite.

What the reading section reads out from the storage medium are, for example, data for specifying a book, and what the selecting section selects are, for example, data for a subsequent number or volume of the book specified by the data read out by the reading section.

In the data distributing system, the storage medium may be brought by the user or may be provided to the user at the site. If the storage medium is stored with data for specifying a book which may be desired by the user, the data are read out by the reading section. Then, based on the read data, a piece of data is selected from the data stored in the storage section, and the selected data are recorded into the storage medium.

It is preferred that such distributing units incorporating the receiving section, the reading section, the selecting section and the recording section are installed in many places. Because the volume of data to be stored in the storage section is enormous and because writing of data into the storage section is to be performed very often, the storage section shall be of a large capacity, and a method wherein the storage section transmits data to the distributing units shall be adopted. If a limitation is set to the data to be distributed to the users, the data may be stored in the distributing units. Also, popular data may be stored in the distributing units.

According to the present invention, users can obtain desirable data by performing an easy process of setting a storage medium in the receiving section.

Another data distributing system according to the present invention comprises: a storage section which stores a plurality of pieces of book data; a display section which displays index information about the book data stored in the storage section; a selecting section which selects a piece of index information from the index information displayed on the display section; a receiving section which receives a storage medium; and a recording section which records book data specified by the index information selected by the selecting section into the storage medium.

In this data distributing system, the user can get index information about the book data stored in the storage section from the display section. Further, when the user selects a piece of index information, book data specified by the selected index information are stored in the storage medium.

Further, another data distributing system according to the present invention comprises: a storage section which stores a plurality of pieces of data; a receiving section which receives a storage medium; a selecting section which selects a specified piece of data from the data stored in the storage section; a recording section which records the specified data into the storage medium; an accounting section which places accounts for the data recorded into the storage medium; a reading section which reads out at least part of the specified data recorded into the storage medium; a deleting section which deletes the specified data from the storage medium; and an account adjusting section which adjusts the accounts placed by the accounting section in accordance with the data deletion performed by the deleting section.

By use of this data distributing system, users can obtain desirable data by only performing an easy process of setting a storage medium in the receiving section. On the other hand, when the user desires deletion of data which have been once recorded into the storage medium, the data can be deleted by the deleting section.

Such data deletion is performed in two kinds of cases. One is a case of returning data which have been purchased by mistake, and this is refundable. In such a case, in this data distributing system, the date and time when the data were recorded to the storage medium are read out, and it is judged whether or not a specified time has passed since the recording date and time. If the specified time has passed, the return of data is not accepted, and the data deletion is not admitted. The other is a case of merely deleting data because of shortage of storage capacity of the storage medium or the like. In such a case, the account adjusting section does not operate, and data deletion is executed on no conditions.

In this data distributing system, users can store desirable data in storage media and can delete undesirable data from storage media. This system eliminates the users' trouble of having to buy data deleting devices by themselves and of throwing away storage media stored with unnecessary data. This data distributing system can be used easily, which may result in wide spread use of this system.

BRIEF DESCRIPTION OF THE DRAWINGS

These and other objects and features of the present invention will be apparent from the following description with reference to the accompanying drawings, in which:

FIGS. 13a through 13m are illustrations which show various ways of displaying information on a display device of the electronic book vending machine.

DETAILED DESCRIPTION OF THE PREFERRED EMBODIMENTS

Preferred embodiments of a data distributing system and a data recording method according to the present invention are described with reference to the drawings.

General Structure of Data Distributing System

Figure 1:
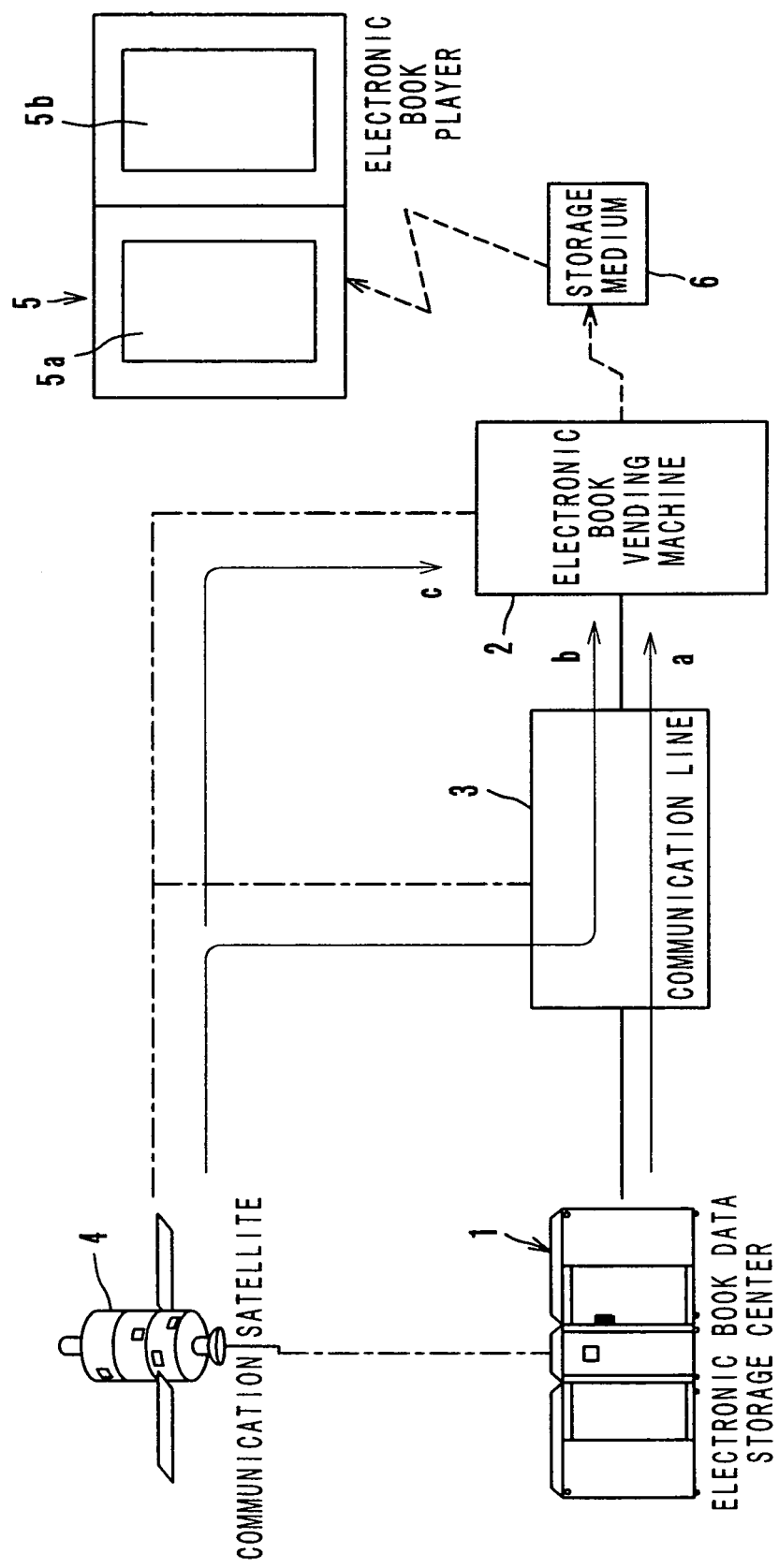
FIG. 1 is a general structural view of a data distributing system according to the present invention.

FIG. 1 shows a general structure of a data distributing system according to the present invention. This system is generally comprised of one electronic book data storage center 1 and a plurality of electronic book vending machines 2. There is provided one storage center 1 in the country or in every main region, and in the storage center 1, all kinds of electronic book data are stored. There are provided one or more vending machines 2 at each of many places where users can easily stop by (convenience stores, stands at stations, etc.). The storage center 1 is connected to the vending machines 2 by telephone lines 3 or via a communication satellite 4 so as to exchange data with the vending machines 2. Between the storage center 1 and the vending machines 2, three communication routes are possible as indicated by arrows "a", "b" and "c" in FIG. 1.

Each vending machine 2, in compliance with a user's (buyer of book data) request, reads electronic book data from the storage center 1 and records the data in a storage medium 6, which can be used in an electronic book player 5 so that the data can be reproduced by the player 5.

The storage medium 6 incorporates a storage element which is capable of recording, reading and deleting data, such as an optical storage element, a photomagnetic storage element, a magnetic storage element, a non-volatile semiconductor storage element or the like. The electronic book player 5 has screens 5a and 5b made of liquid crystal or the like. The storage medium 6 is attachable to and detachable from the player 5, and the player 5 is capable of reproducing book data stored in the storage medium 6 on the screens 5a and 5b.

Structure of Vending Machine

Figure 2:
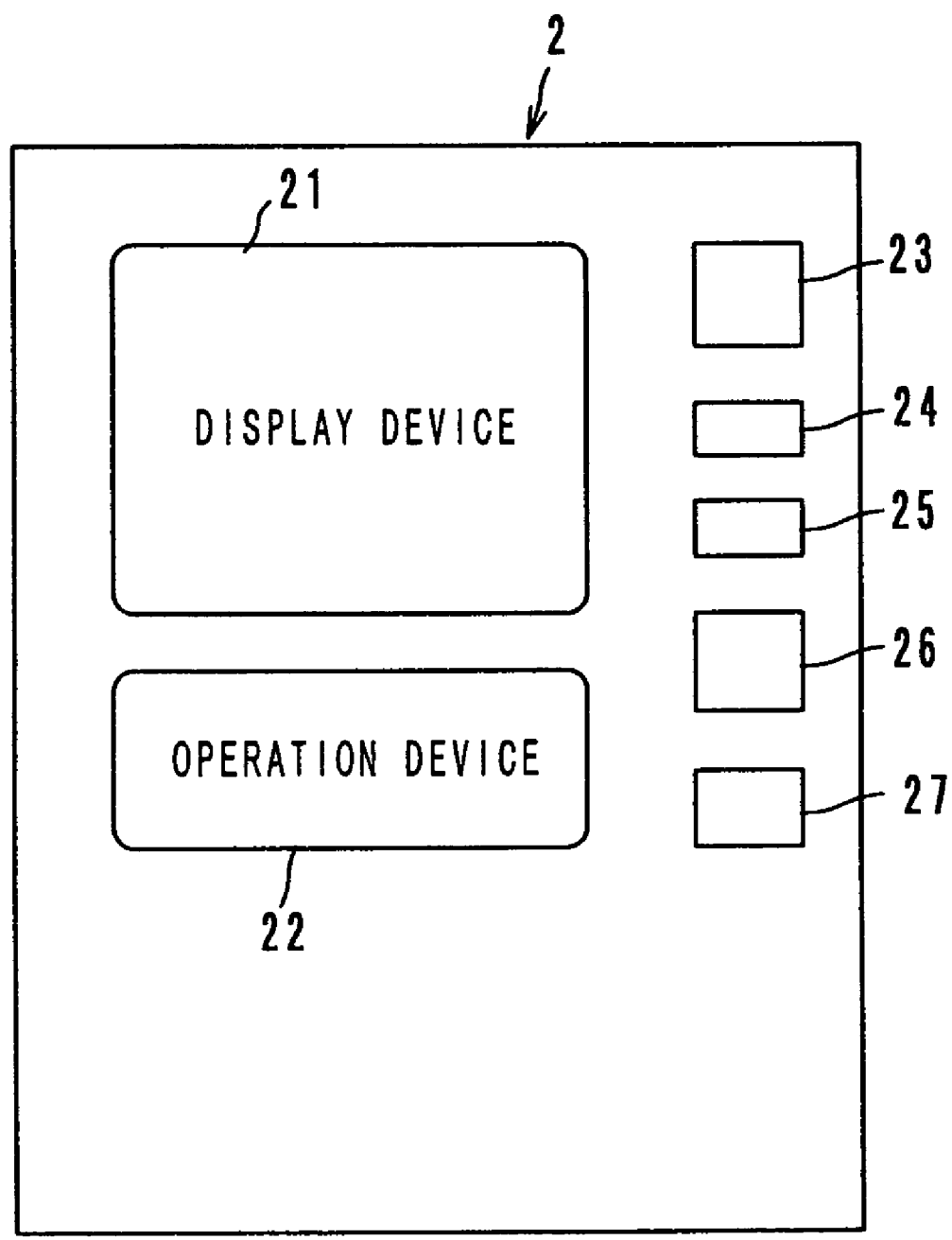
FIG. 2 is a front view of an electronic book vending machine incorporated in the system.

FIG. 2 is a front view of the electronic book vending machine 2. On the front side, a display device 21, an operation device 22, a cash receiver 23, a credit card receiver 24, a storage medium receiver 25, a change ejecting device 26, a purchased storage medium ejecting device 27, etc. are provided. The operation device 22 incorporates a keyboard for inputs of letters and buttons for selection. Otherwise, the display device 21 may be so designed to display touch switches which serve as an operation panel.

Control Circuit

Figure 3:
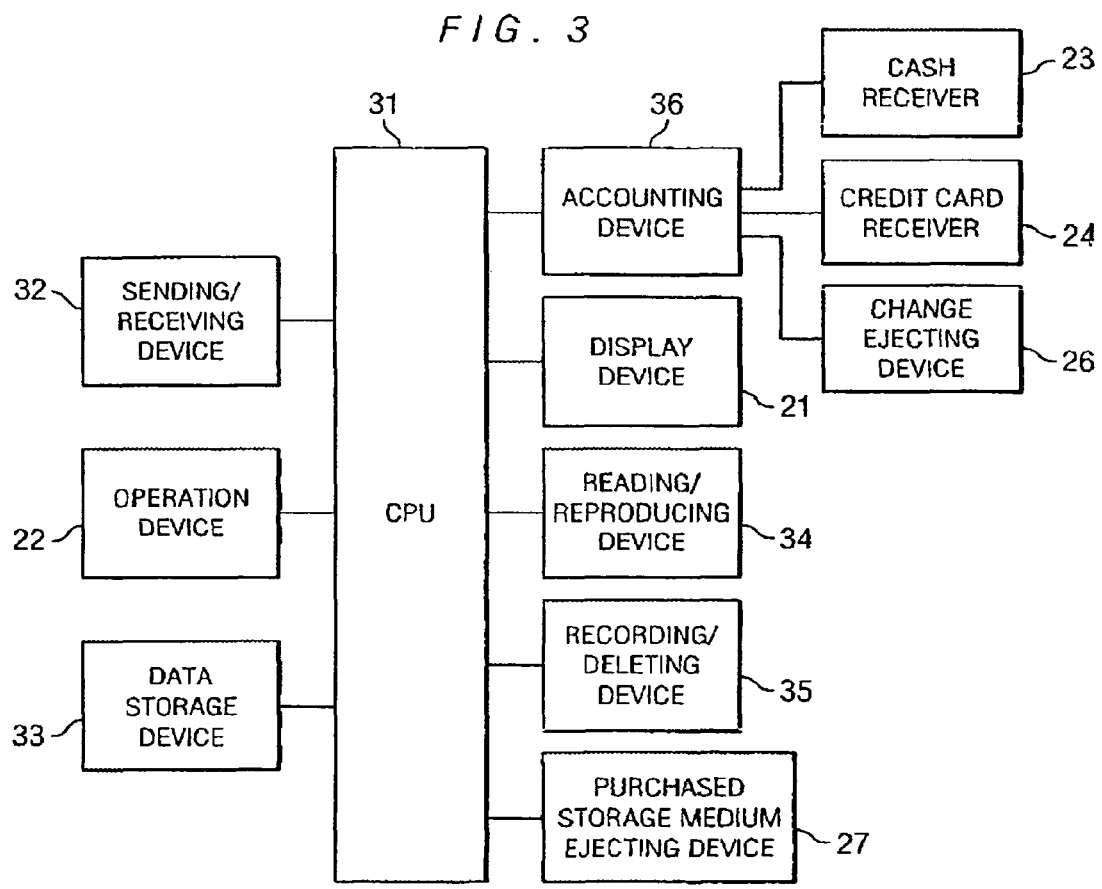
FIG. 3 is a block diagram which shows a control circuit of the electronic book vending machine.

FIG. 3 shows a control circuit of the electronic book vending machine 2. The main member of this circuit is a CPU 31 and comprises the operation device 22, a data storage device 33, the display device 21, a reading/reproducing device 34 which reads data from the storage medium 6 and reproduces the data, a recording/deleting device 35 which records or delete data to or from the data storage medium 6, the purchased storage medium ejecting device 27, etc. The cash receiver 23, the credit card receiver 24 and the change ejecting device 26 are connected to the CPU 31 via an accounting device 36. The data storage device 33 is temporarily stored with book data which have been sent from the storage center 1 and received by the data sending/receiving section 32. The purchased storage medium ejecting device 27 has a stock of new storage media which have been initialized but have not been stored with any book data, and in accordance with the user's operation, ejects such a new storage medium.

Control Procedure

Next, a way of using the electronic vending machine 2 is described following a control procedure carried out by the CPU 31.

Initialization

Figure 4:
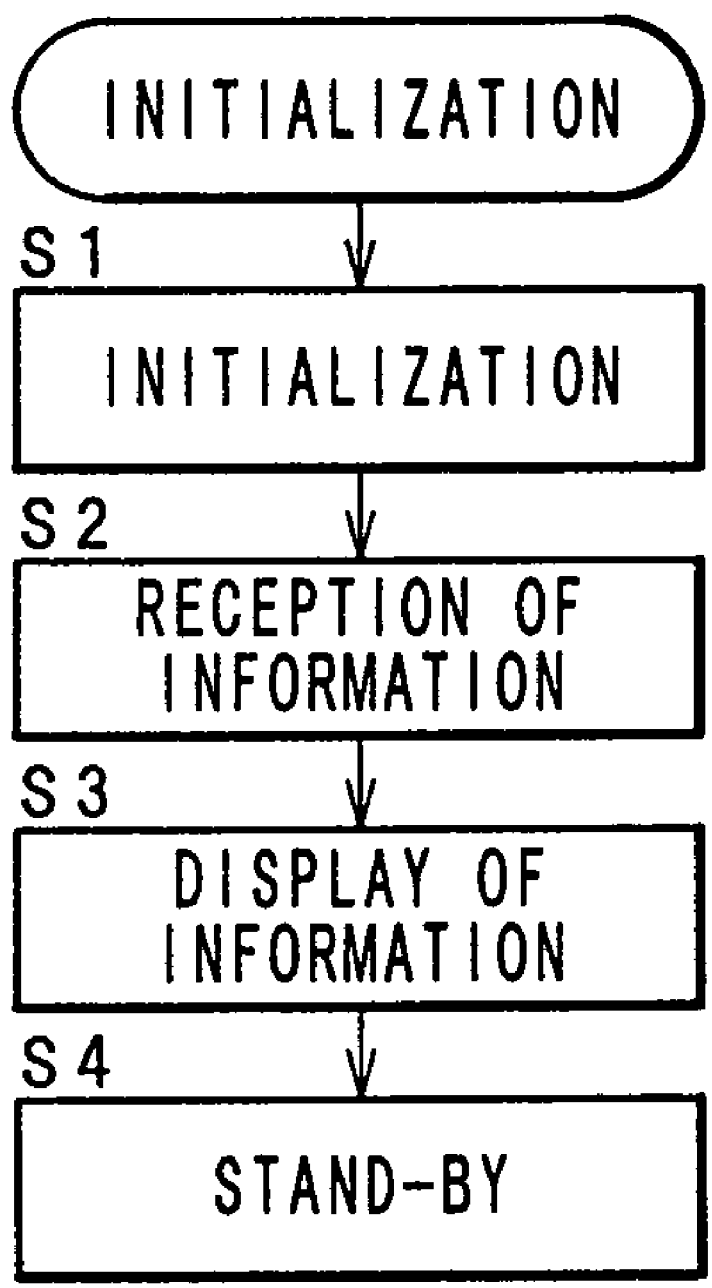
FIG. 4 is a flowchart which shows a control procedure (main routine) of the control circuit.

FIG. 4 shows a main routine of the CPU 31. When the CPU 31 is reset, all the members are initialized at step S1. At step S2, information to be displayed on the display device 21 in a stand-by state is read out. This information is, for example, an advertisement of a certain book which has been set by the store where the vending machine 2 is installed or has been sent from the storage center 1. At step S3, the information is displayed on the display device 21. The display device then enters a standby mode at step S4 while awaiting instructions.

Operation

Figure 5:
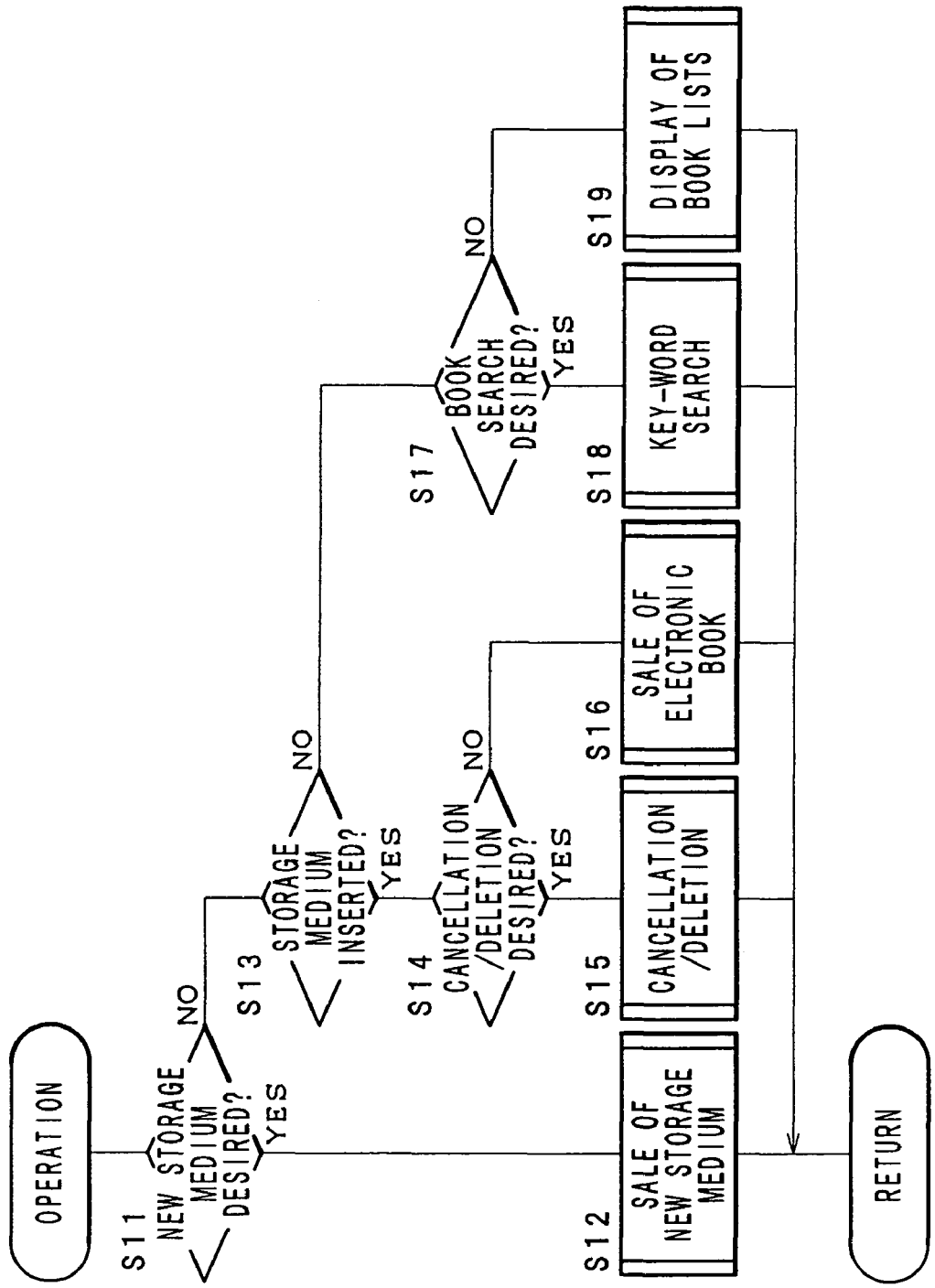
FIG. 5 is a flowchart which shows an operation subroutine.

FIG. 5 shows a control procedure of the operation device 22 when a user operates the device 21. First at step S11, it is judged whether or not a new medium button has been pressed.

When the button has been pressed, which means when the user wants a new storage medium, a sale of a new medium is performed at step S12. The detailed description of this process is omitted. If a new storage medium is not desired, "NO" at S11, then at S13 the program checks to see if a storage medium has been inserted.

When a storage medium is inserted in the storage medium receiver 25 ("YES" at step S13), it is judged at step S14 whether or not cancellation/return or deletion of book data from the storage medium is desired. If cancellation or deletion of data is desired, data cancellation/deletion is performed at step S15. If cancellation/deletion is not desired, a sale of book data is performed at step S16.

If any storage medium is not inserted ("NO" at step S13), it is judged that the user wants to search for a book to buy, and it is judged at step S17 whether or not the user wants to make a key-word search. If "YES", a key-word search is performed at step S18. If "NO" at step S17, categorized book lists are displayed at step S19 so that the user can select a desirable book.

In the following, control procedures at steps S15, S16, S18 and S19 are described.

Display of Book Lists

Figure 6:
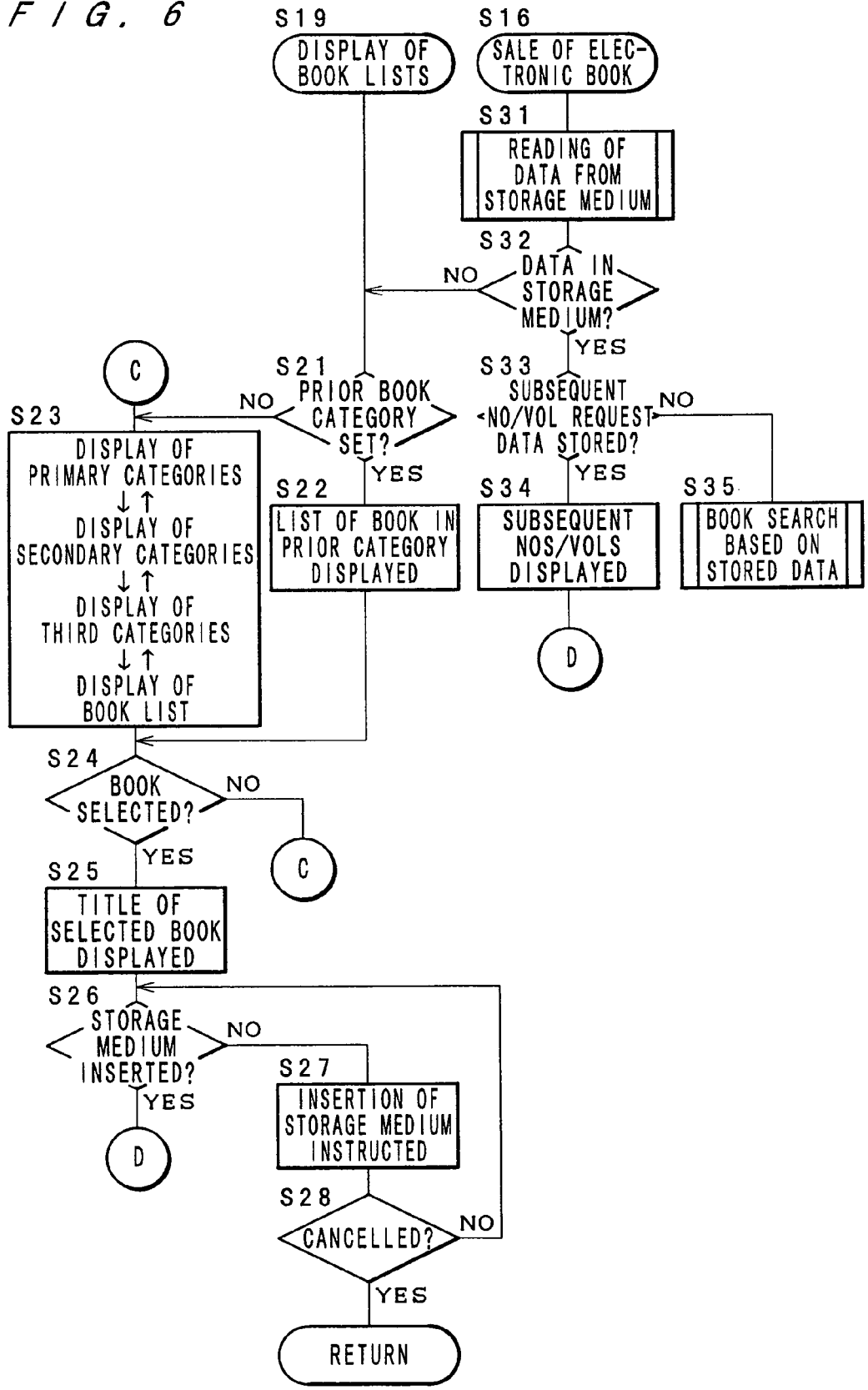
FIGS. 6 through 8 are flowcharts which show a subroutine for a display and a sale of an electronic book.
Figure 7:
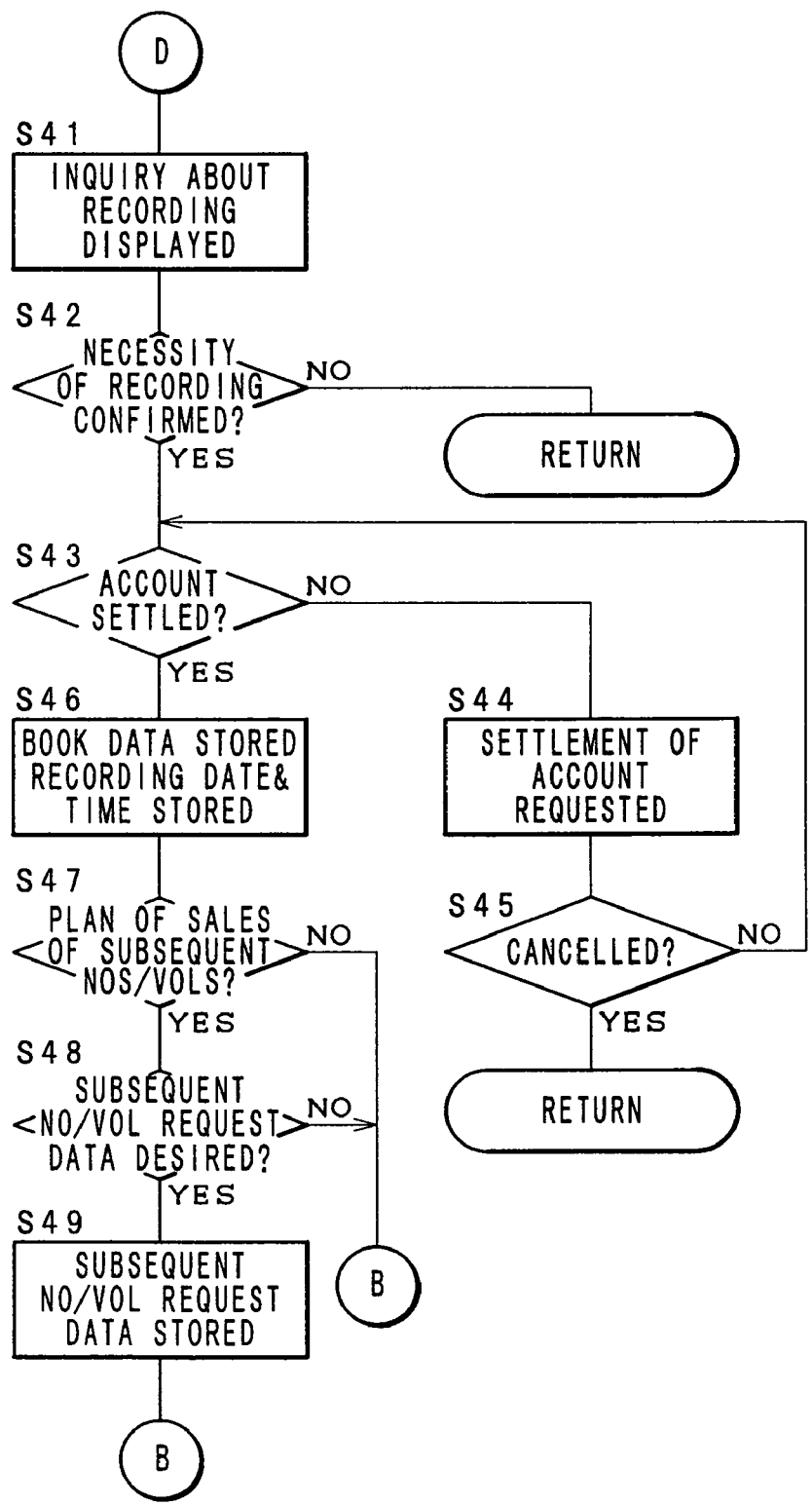
Figure 8:
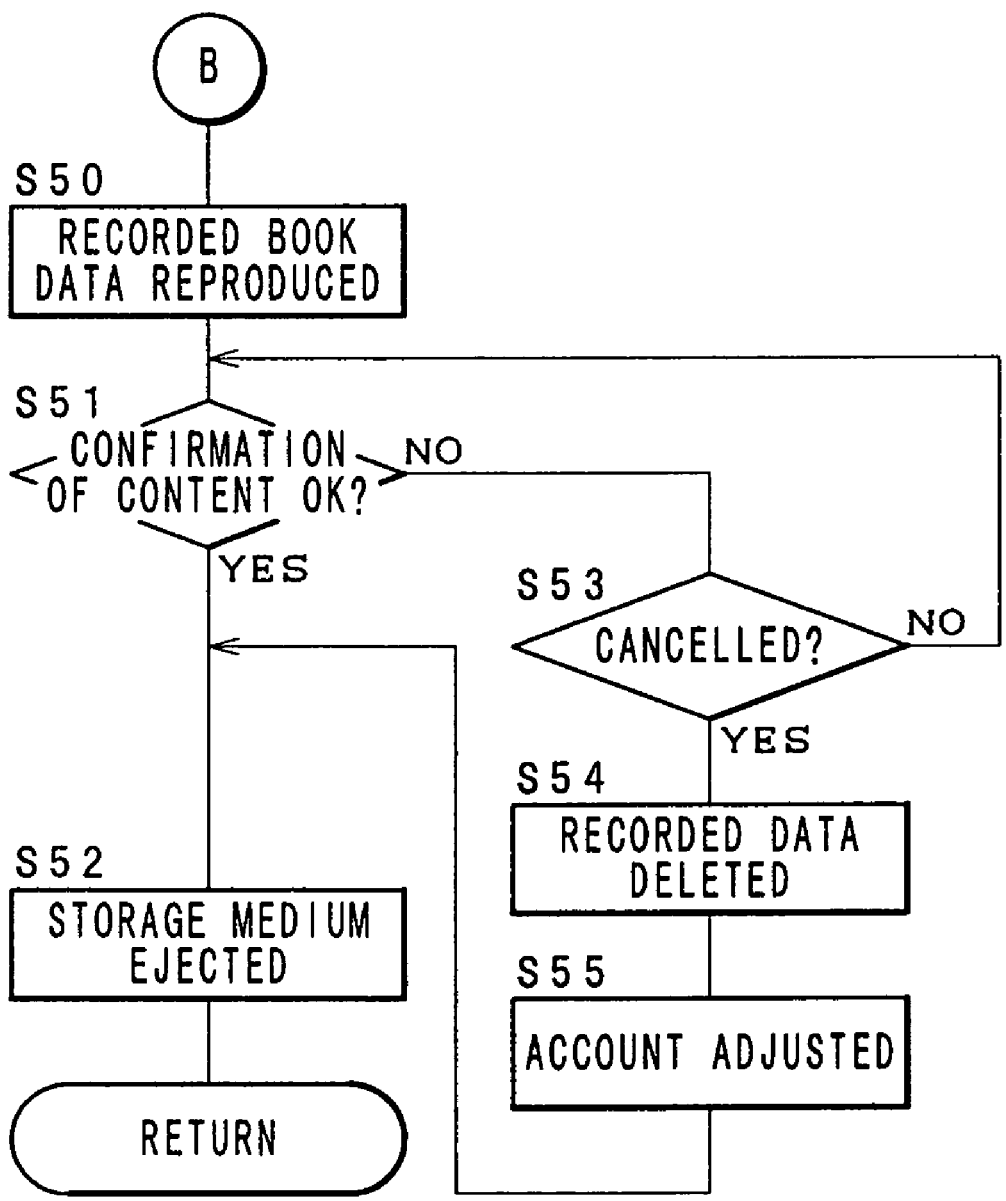

FIGS. 6, 7 and 8 show a subroutine for a sale of book data performed at step S16 and for a display of book lists performed at step S19. First, a process of displaying categorized book lists is described. In accordance with the user's operation with a selection button, a book list of a selected category is displayed on the display device 21. If the store which owns the vending machine 2 sets a prior book category ("YES" at step S21), a book list of the category is displayed at step S22. Further, a list of books which come into sale recently may be displayed in a stand-by state (see FIG. 13a).

If the store does not set a prior book category, general (primary) categories of books, namely, magazines, technical books, stories, practical books, etc. are listed on the display device 21 at step S23 (see FIG. 13b). When the user selects one of these primary categories, specific (secondary) categories of the primarily selected group are listed. For example, if "magazines" is selected as the primary category, secondary categories such as science, sports, cars, etc. are listed. If "practical books" is selected, secondary categories such as pleasure, business, languages, etc. are listed (see FIG. 13c).

Then, when the user selects one of these secondary categories, more specific (third) categories of the secondarily selected group are listed. For example, if "sports" is selected as the secondary category, third categories such as baseball, soccer, ski, etc. are listed (see FIG. 13d). If "pleasure" is selected, third categories such as fishing, pets, pictures, etc. are listed. Then, when the user selects one of these third categories, the titles of books in the selected group are displayed (see FIG. 13e).

If the store which owns the vending machine 2 especially wants to sell books of a certain group, the display device 21 may be so controlled to display the third categories of the group in a stand-by state.

Recording of Book Data

If no book is selected, "NO" at S24, then the program returns to S23. When it is judged at step S24 that the user has selected a book, the title of the selected book is displayed at step S25, and it is judged at step S26 whether or not a storage medium is in the receiver 25. If there are no storage media in the receiver 25, a message to instruct the user to insert a storage medium in the receiver 25 is displayed at step S27 (see FIG. 13f, and the program waits until cancellation is requested at step S28 or until a storage medium is inserted in the receiver 25.

When a storage medium is inserted in the receiver ("YES" at step S26), an inquiry to ask the user whether or not the user intends to store the book data in the storage medium is displayed at step S41. After the user's intention of storing the book data in the storage medium is confirmed at step S42, settlement of the account (insert of cash or use of a credit card) is confirmed at step S43. If the account has not been settled, a message to request settlement of the account is displayed at step S44, and the program waits until cancellation is requested at step S45 or until the account has been settled. When the settlement of the account is confirmed ("YES" at step S43), at step S46, the book data and also the date and time are stored in the storage medium. If the user does not intend to store the book data, "NO" at S42, the program returns.

Recording of Request Data for the Subsequent Numbers or Volumes

If there is a sales plan of the subsequent numbers or volumes of the book of which data have been recorded at step S46 ("YES" at step S47), an inquiry to ask the user whether or not the user wants data to be used to request the subsequent numbers or volumes is displayed at step S48. If the user's desire for the data is confirmed, the data is stored in the storage medium at step S49. If the user wants subscription, such request data may be automatically stored in the storage medium.

Reproduction of Recorded Data

On completion of recording of the book data into the storage medium in the above-described way at S49, or is "NO" at S47 or S48, at step S50, the recorded book data are reproduced on the display device 21 so that the user can recognize the content. When the user inputs his/her OK at step S51, the storage medium is ejected from the vending machine 2 at step S52. On the other hand, if the user wants cancellation ("YES" at step S53), the recorded book data are erased from the storage medium at step S54. Then, the account is adjusted at step S55, and the storage medium is ejected at step S52. If "NO" at S53, then the program again requests user confirmation of content at S51.

Automatic Selection of Book

When a storage medium is inserted in the vending machine 2, the reading/reproducing device 34 at step S31 works to read the data from the storage medium and judges at step S32 whether or not there are any data in the storage medium. If no data is stored on the storage medium, "NO" at S32, the program proceeds to S21. If there are data in the storage medium, it is confirmed at step S33 whether or not there are request data for the subsequent numbers or volumes. If "YES" at step S33, from the books of which data are in the storage medium and of which subsequent number/volume request data are in the storage medium, ones of which subsequent numbers and volumes are on sale are displayed at step S34 (see FIG. 13g). Thereafter, the processes at step S41 and the subsequent steps are performed to store desired book data in the storage medium.

It is possible to use a storage medium exclusively for a specified book. Specifically, subsequent number/volume request data of a specified book are stored in a storage medium beforehand, and thereby, when the storage medium is inserted in the vending machine 2, the reading/reproducing device 34 reads the request data, which results in automatic selection of the subsequent numbers or volumes of the book. This method allows users to subscribe weekly or monthly magazines in an easy way.

Way of Searching Books Related to Data in Storage Medium

Even if there are no subsequent number/volume request data ("NO" at step S33) in the storage medium, books related to the book data stored in the storage medium are searched automatically at step S35.

Figure 9:
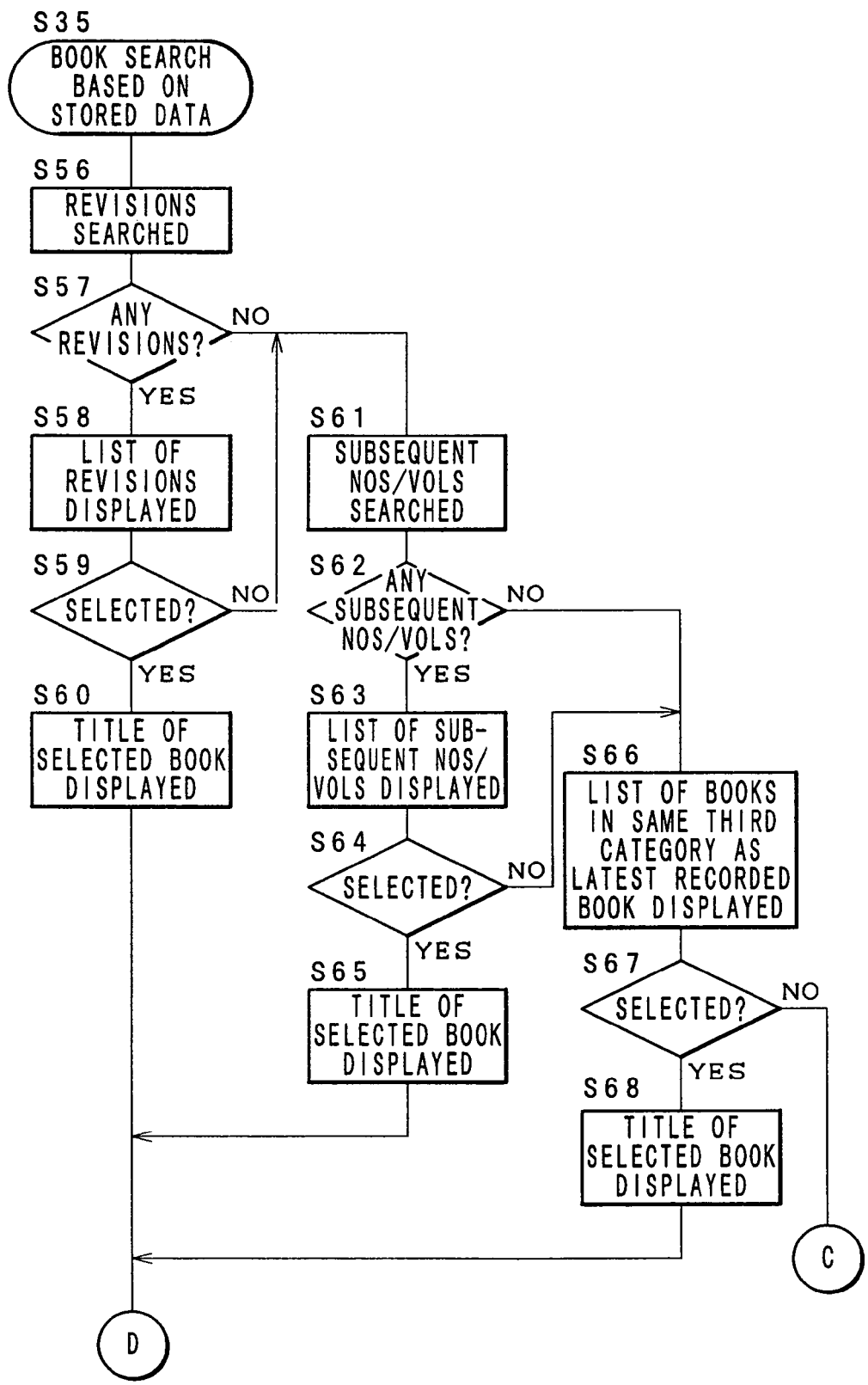
FIG. 9 is a flowchart which shows a subroutine for using stored data for a book search.

FIG. 9 shows a subroutine for a book search by use of the stored data. At step S56, any revisions of the books of which data are in the storage medium are searched. If it is confirmed at step S57 that there are any revisions of the books, a list of these revisions is displayed on the display device 21 at step S58 (see FIG. 13h). If the user selects/determines to buy one of these revisions at step S59, the title of the selected one is displayed at step S60, and the processes at step S41 and the subsequent steps are performed.

If there are no revisions ("NO" at step S57), any subsequent numbers or volumes of the books are searched at step S61. If it is judged at step S62 that there are subsequent numbers or volumes of the books, a list thereof is displayed on the display device 21 at step S63. Also, when the user does not want to buy any of the revisions ("NO" at step S59), the program goes to step S61. Next, at S64 if the user selects/determines to buy one of these numbers and volumes, the title of the selected one is displayed at step S65. Then, the processes at step S41 and the subsequent steps are performed.

When there are no subsequent numbers or volumes ("NO" at step S62) or when the user does not want to buy any of the subsequent numbers and volumes ("NO" at step S64), a list of books in the same third category as the book of which data were recorded the latest is displayed on the display device 21 at step S66. Here, a list of books written by the same writer as the latest recorded book may be displayed. Then, if the user selects one from this list to buy at step S67, the title of the selected book is displayed at step S68, and the processes at step S41 and the subsequent steps are performed. If the user does not want to buy any of the books displayed at step S66 ("NO" at step S67), the program goes to step S23 to display categorized book lists.

Another Way of Searching Books Related to Data in Storage Medium

Figure 10:
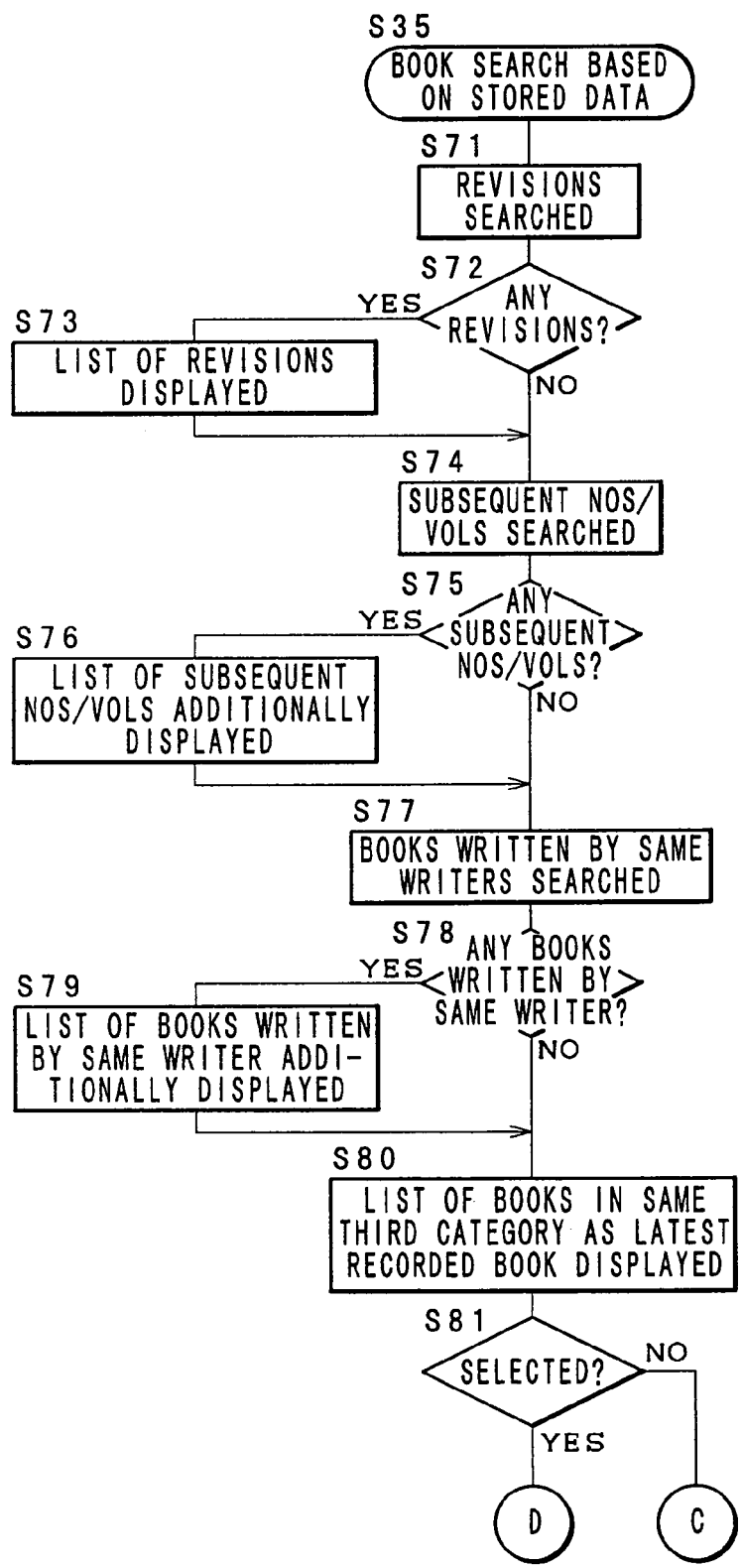
FIG. 10 is a flowchart which shows another subroutine for using stored data for a book search.

Also, books related to the data stored in the storage medium may be searched and displayed under a procedure shown by FIG. 10. In this procedure, as FIG. 13m shows, books related to the data stored in the storage medium from various aspects are listed on the display device 21 at one stage, and the user selects/determines one from the list.

At step S71, revisions of the books of which data are in the storage medium are searched, and if it is judged at step S72 that there are revisions, a list of the revisions is displayed on the display device 21 at step S73. If there are no revisions, the subsequent numbers or volumes of the books are searched at step S74. If it is judged at step S75 that there are subsequent numbers or volumes, a list of these numbers and volumes is additionally displayed on the display device 21 at step S76. Further, whether "YES" or "NO" at S75, books written by the same writers as the books are searched at step S77. If it is judged at step S78 that there are other books written by the writers, a list of the books is additionally displayed on the display device 21 at step S79. Furthermore, whether "YES" or "NO" at S78, a list of books in the same third category as the book of which data were recorded the latest is additionally displayed at step S80.

When the user selects/determines a book to buy from the list at step S81, the processes at step S41 and the subsequent steps are performed. If the user does not find any desirable books in the list, the program goes to step S23, so that categorized book lists will be displayed.

An inquiry as shown by FIG. 13i may be displayed when data are read from the storage medium at step S31, so that the user can select a way of searching books. Then, in accordance with the user's selection, a list of books is displayed.

Key-Word Search

Figure 11:
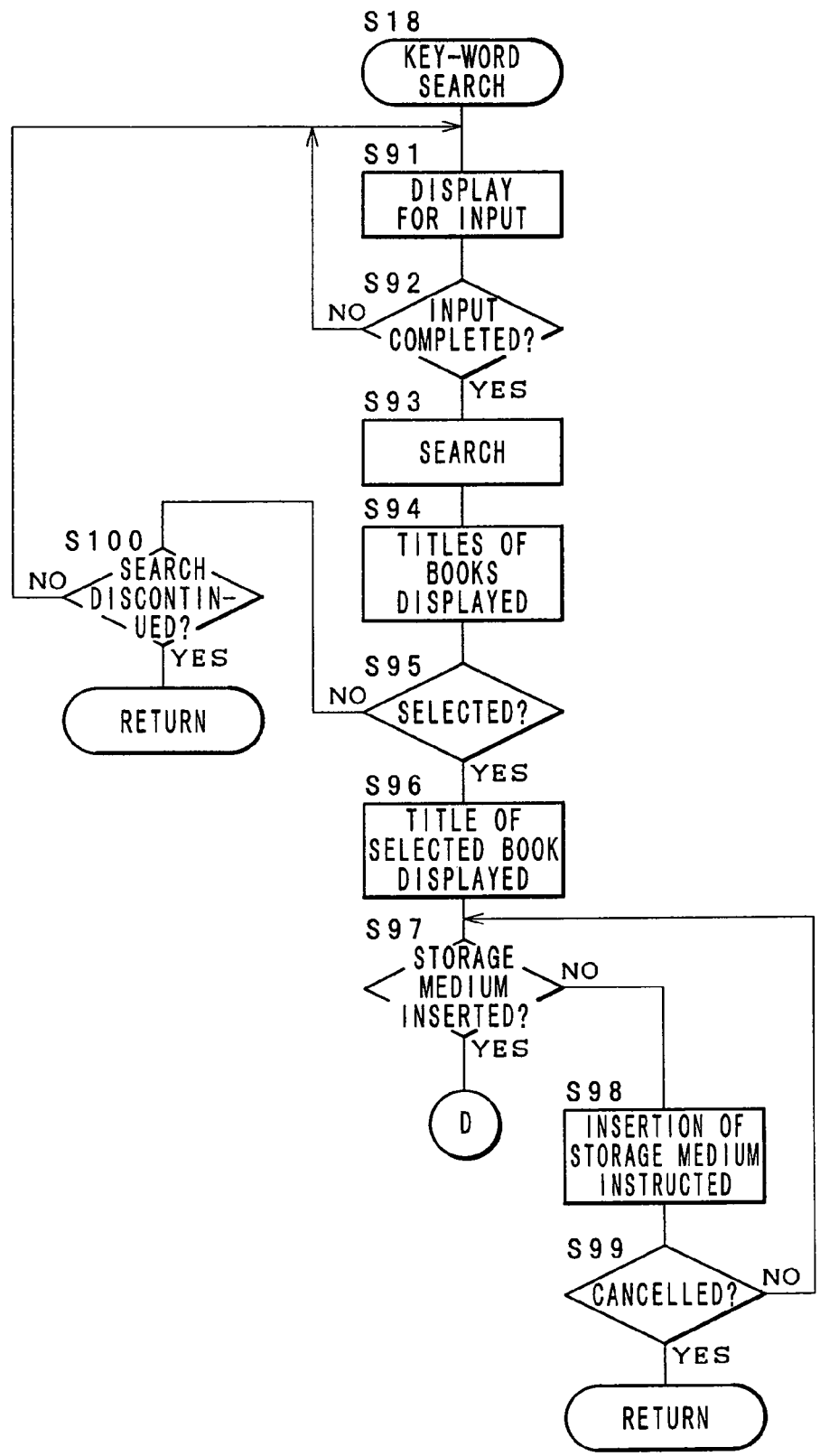
FIG. 11 is a flowchart which shows a subroutine for a key-word search.

FIG. 11 shows a subroutine for a key-word search performed at step S18. When the user selects a book search at step S17 (see FIG. 5), first at step S91, a picture for inputting a key word appears on the display device 21 (see FIG. 13j). When the user inputs the title of a book, the name of a writer and/or a publisher are inputted at step S92, searched at S93, and the searched book(s) is/are listed at step S94. When the user selects/determines a book to buy at step S95, the title of the selected book is displayed at step S96. If the user does not input search information, "NO" at S92, the program continues to prompt with the displayed picture at S91.

Next at step S97, it is confirmed that a storage medium is inserted in the receiver 25, and the processes at step S41 and the subsequent processes are performed. If there are no storage media in the receiver 25, a message to instruct the user to insert a storage medium in the receiver 25 is displayed at step S98, and the program waits until cancellation is requested at step S99 or until a storage medium is inserted.

On the other hand, if the user wants none of the books on the list ("NO" at step S95), it is judged at step S100 whether the search is to be discontinued or to be continued. If the search is to be continued, the program goes back to step S91. If the search is not to be continued, ("NO" at 100), the subroutine returns to the calling routine.

Cancellation/Deletion

Figure 12:
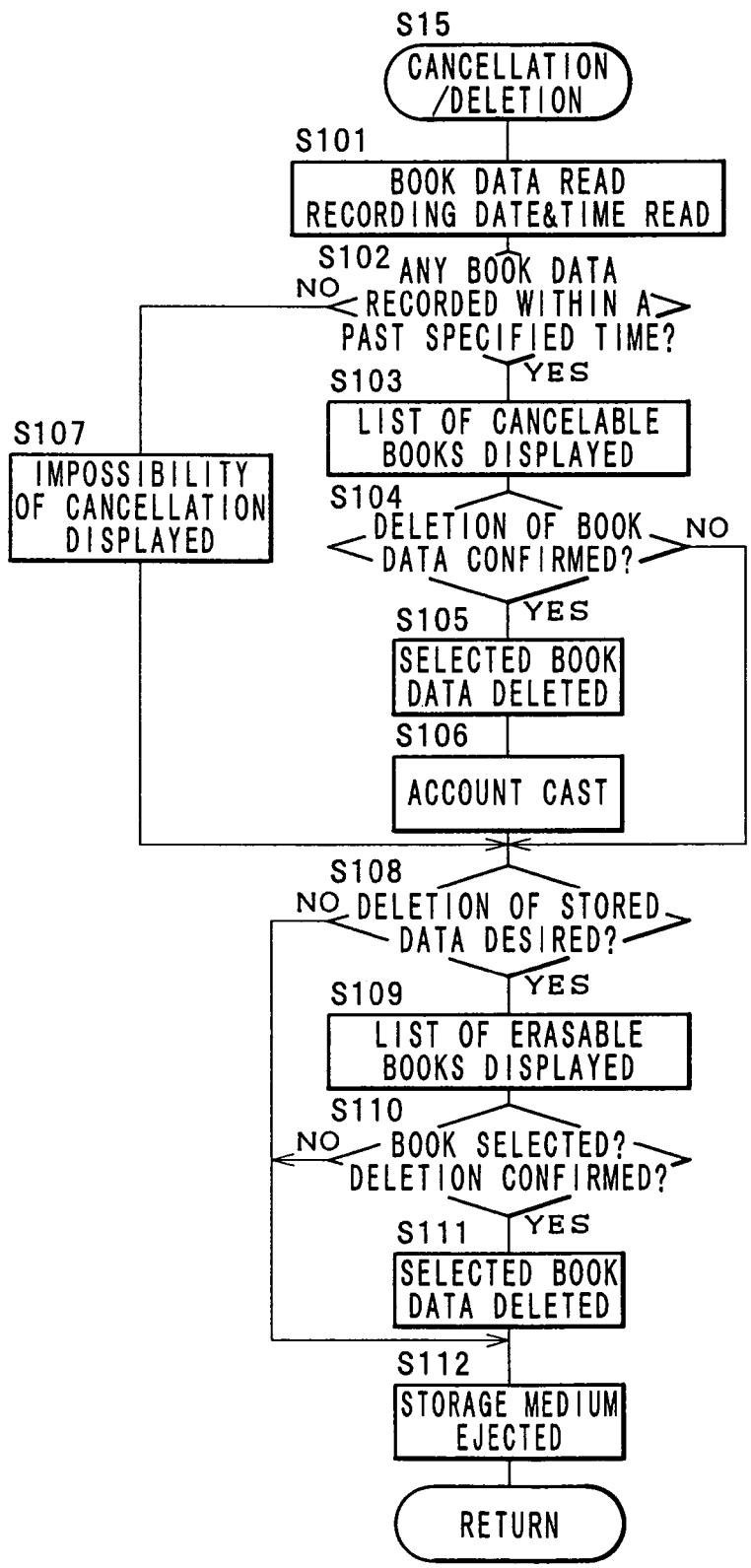
FIG. 12 is a flowchart which shows a subroutine for data cancellation/deletion.

FIG. 12 shows a subroutine for data cancellation/deletion performed at step S15. This subroutine is executed when the user wants to return book data which the user has once purchased or when the user wants to delete book data because of short of memory or the like. When the user selects data cancellation/deletion at step S14 (see FIG. 5), first at step S101, the content of data stored in the storage medium and the recording date and time are read out, and it is judged at step S102 whether or not there are any book data which have been purchased for the past specified hours. Book data are returnable only within a specified time from the recording time. If there are no such book data in the storage medium, an indication that cancellation is impossible is displayed at step S107, and the program goes to step S108.

If there are any returnable book data, a list of such books is displayed on the display device 21 at step S103. After the user selects book data to return at step S104, the selected book data are deleted from the storage medium at step S105. Then, the account is settled at step S106. At this time, a refund of the payment for the book data is made, and a communication fee and the like are deducted from the refund. After S106 or if "NO" at S104, the program proceeds to S108.

At and after step S108, a procedure to delete stored data is performed. When the user wants to delete data from the storage medium because the remaining capacity of the storage medium is small or any other reason, this procedure is executed. When the user's intention to delete data from the storage medium with no refunds is confirmed at step S108, a list of erasable book data is displayed on the display device 21 at step S109. When the user selects/determines book data to delete at step S110, the selected data are deleted from the storage medium at step S111. Following S111 or if "NO" at S108 or "NO" at 110, then the storage medium is ejected from the vending machine 2 at step S112.

In the procedure to delete data, although the text data of the selected book are deleted, the index information about the book such as the title, the writer, the category, etc. may be left stored. If such information is left stored in the storage medium, it is possible to make an automatic book search using the information. This procedure of deleting data can be effectively adopted in libraries which do not charge the users in the premise that the users will return the book data. In this case, by deleting only the text data of a book and not deleting the index information, the user can use the index information later for an automatic book search, which will result in an efficient book search.

Display of Advertisement

When the user selects a book (at step S25, S34, S60, S65, S68 or S96), an advertisement of the book may be displayed to prompt the user to buy the book. For example, pictures shown by FIGS. 13k and 13l are displayed alternately. A motion picture may be displayed, and it will be effective to display a motion picture like a preview of a movie.

Other Embodiments

The electronic book vending machines and the electronic book players may be of any structure. The electronic book vending machines may be stored with popular book data, so that the vending machines may be imparted with a function of the data storage center. In the above embodiment, the vending machines are to sell book data for profit and cast accounts. However, such vending machines can be installed in libraries or any other public places as members of a system to distribute book data with no profit.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A data distributing system configured to record data selected by a user from a plurality of pieces of data displayed to the user on a display device into a storage medium supplied by the user, further configured to delete recorded data from the storage medium when the user does not accept the recorded data, and further configured to adjust an account associated with the user in accordance with deletion of the recorded data before returning the storage medium to the user, said system comprising:

a storage section configured to store a plurality of pieces of data;

a receiving section configured to receive the storage medium from the user, the receiving section further configured to return the storage medium to the user when the user's transactions with the data distributing system are completed;

the display device configured to display information identifying each of a plurality of pieces of data;

a selecting section configured to accept the user's selection of a specified piece of data from the data stored in the storage section;

a recording section configured to record the selected specified piece of data into the storage medium;

an accounting section configured to settle an account associated with the user for the specified piece of data recorded into the storage medium;

a reading section configured to read at least part of the specified piece of data recorded into the storage medium;

a prompting section configured to display the read information read out by the reading section and further configured to query the user for acceptance or rejection of the specified piece of data recorded in the storage medium;

a deleting section configured to delete the recorded specified piece of data from the storage medium in response to the user input indicating that the specified data recorded in the storage medium is rejected by the user; and an account adjusting section configured to reverse the settling of the at least one account associated with the user by adjusting the account associated with the user in accordance with the data deletion performed by the deleting section.

2. The data distributing system according to claim 1, wherein a first apparatus which comprises the receiving section, the reading section, the selecting section and the recording section is connected to a second apparatus which comprises the storage section by a communication line.

3. The data distributing system according to claim 2, wherein the communication line is at least one of a telephone line and a communication satellite.

4. The data distributing system according to claim 1, wherein the data read out by the reading section includes a date and time when the specified data was recorded into the storage medium.

5. The data distributing system according to claim 4, further comprising a control section configured to inhibit the deleting section from deleting the specified data on and after passage of a specified time from the recording date and time.

6. The data distributing system according to claim 1, wherein the specified data are book data.

7. A method performed by an electronic data machine for recording data selected by a user from a plurality of pieces of data displayed to the user on a display device into a storage medium supplied by the user, and when the user does not accept recorded data, deleting the recorded data from the storage medium and adjusting an account associated with the user in accordance with deletion of the recorded data before returning the storage medium to the user, said method comprising the steps of:

receiving the storage medium from the user;

displaying on the display device information identifying each of a plurality of pieces of data;

selecting a specified piece of data from the plurality of pieces of data displayed on the display device;

recording the selected specified piece of data into the storage medium;

settling at least one account associated with the user for the recorded specified piece of data;

reading at least part of the specified piece of data recorded in the storage medium;

displaying information from the read data on the display device and querying the user for acceptance or rejection of the specified piece of data recorded in the storage medium;

deleting the recorded specified piece of data from the storage medium when the specified piece of data recorded in the storage medium is rejected by the user;

reversing the settling of the at least one account by adjusting the at least one account associated with the user in accordance with the data deletion; and returning the storage medium to the user.

* * * * *